3,314,192
PLANT GROWING SHELF ARRANGEMENT
George Barratt Park, Cokesbury Road,
Greenwood, S.C. 29646
Filed June 1, 1964, Ser. No. 371,284
1 Claim. (Cl. 47—18)

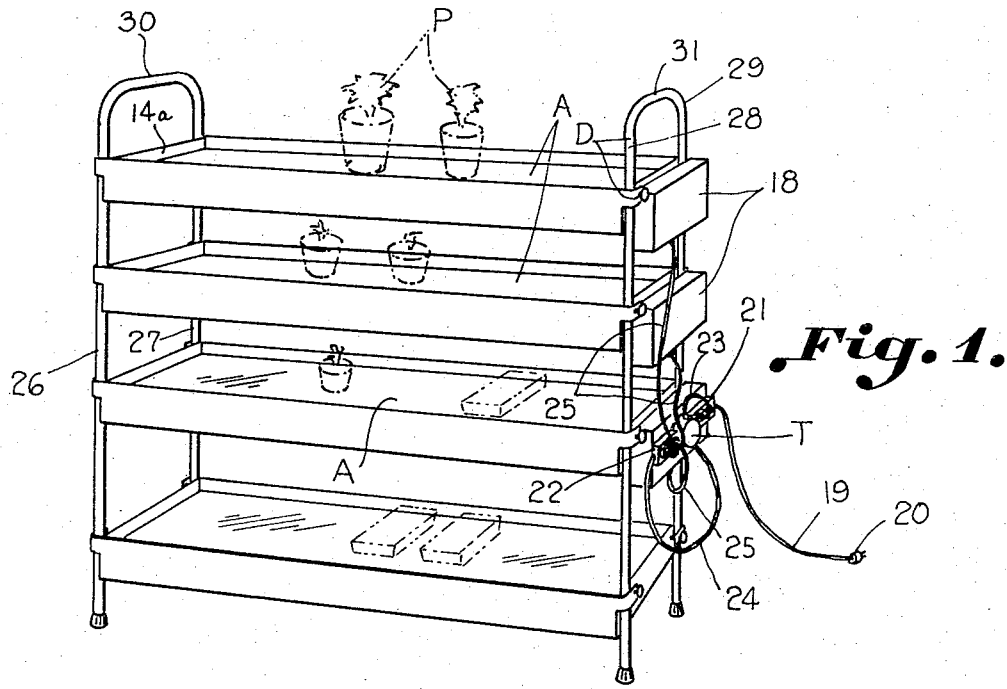
Fig. 1.
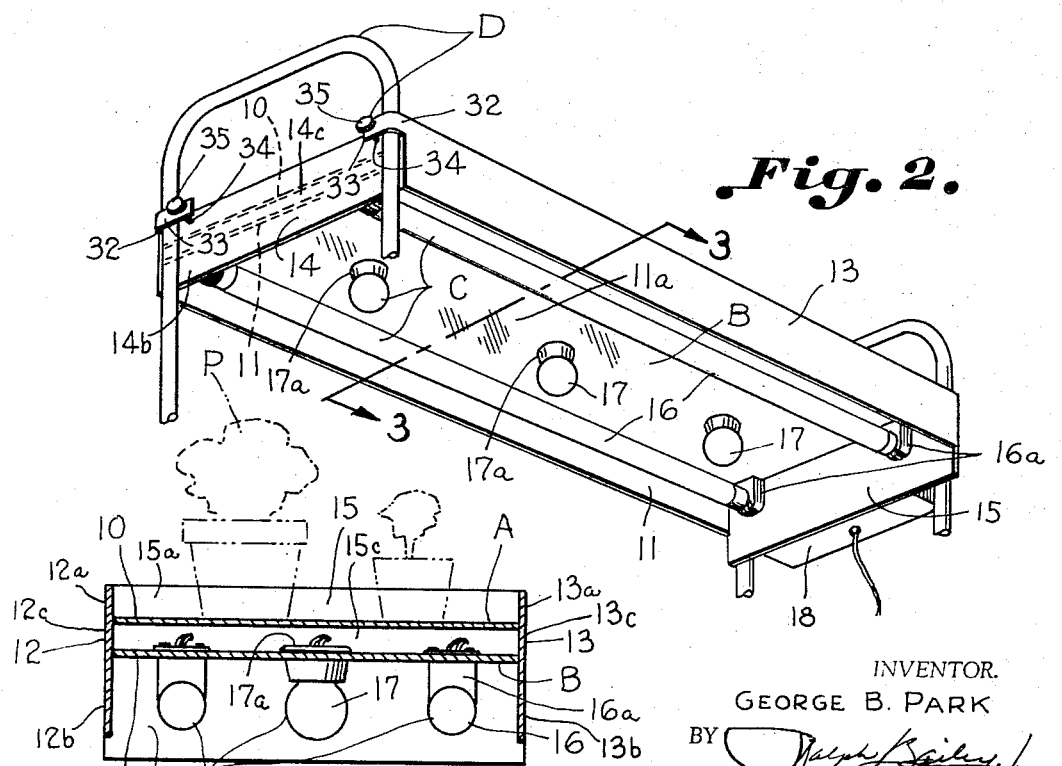
Fig. 2.
Fig. 3.
INVENTOR.
GEORGE B. PARK
ATTORNEY

United States Patent Office 3,314,192
Patented Apr. 18, 1967

This invention relates to a device for germinating seeds and growing seedlings and the like.

Former arrangements for germinating seeds and growing seedlings have included separate trays, each having a light source provided with reflector means positioned above the trays. Since such devices were used separately separate sources of electrical energy were provided for the light sources and, of course, each such tray occupied its own floor space to the exclusion of other things. Considerable heat energy was wasted by radiation of heat above the light source thus being ineffective to heat the tray positioned below.

Accordingly, it is an important object of this invention to provide a shelf arrangement for growing seedlings and the like which occupies a minimum of floor space and permits full utilization of the light and heat energy developed by a light source.

Another important object of the invention is to provide a stacked tray arrangement in which the trays are adjustable and provide a gentle heat from below the plant as well as heat from a light source positioned above the plant.

Another important object of the invention is to provide a water-tight tray for holding plants, the bottom of which serves as a reflector for both fluorescent and incandescent light sources so that a gentle heat is imparted to the plants on the top of the tray radiating from the light sources and a full spectrum source of light is provided below the tray.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a perspective view illustrating a shelf arrangement constructed in accordance with the present invention, FIGURE 2 is an enlarged perspective view looking toward a single tray from the lower left-hand side of FIGURE 1, and FIGURE 3 is an enlarged transverse sectional view taken on the line 3—3 in FIGURE 2.

The drawing illustrates a device for germinating seeds, growing seedlings and the like including, a number of vertically spaced superposed shelves or tray assemblies for supporting the seedlings. Each tray includes an open upper water-tight tray portion A. Each tray, except the lowermost tray, includes a lower reflective element B carried closely adjacent the upper tray portion in heat transfer relation thereto such that a gentle heat is imparted to plants on the upper tray portion. A light source C is carried below and closely adjacent the reflective element. Support means D stack the trays in superposed relation for vertical adjustment. It will be noted that the light source provides energy in form of light to plants below and a gentle heat to tray portions positioned above.

Referring more particularly to the drawing, a shelf constructed in accordance with the invention has an upper water-tight tray portion which includes a horizontal imperforate bottom portion 10. A second spaced partition 11 is provided parallel and closely spaced with respect to the tray portion 10. A pair of sides 12 and 13 are provided as are end portions 14 and 15. The partitions 10 and 11 are attached to the sides 12 and 13 and the ends 14 and 15 by any suitable means, such as welding (not shown).

It will be observed that the upper tray A has sides formed by the portions 12a, 13a, 14a and 15a, respectively. The lower tray B includes the lower partition 11 having a light reflective surface 11a on the lower side thereof. Depending portions 12b, 13b, 14b, and 15b, respectively, form a shield or reflector for directing the light and heat energy downwardly toward the tray positioned immediately therebelow. The partitions 10 and 11, together with intermediate portions 12c, 13c, 14c, and 15c, respectively, form an intermediate compartment housing electrical wiring and a portion of the lighting fixtures described below.

The light source C includes fluorescent lights 16 and incandescent lights 17 to provide a complete spectrum of light as needed by the plants P. The fluorescent lights 16 are provided with suitable fixtures 16a secured within the partition 11, the upper portion of the fixtures together with the wiring being confined within the intermediate enclosure between the partitions 10 and 11 for protecting same against water and dirt, as well as contact by the plants and the user. Suitable light fixtures 17a are similarly provided for the incandescent lights 17. End enclosures 18 are suitably secured as by welding (not shown) to the outside of the end members 15 for containing the ballast for the fluorescent lights 16.

It will be noted by reference to FIGURE 1 that a suitable cord 19 has a plug 20 for insertion into a wall socket to serve as a source of electrical energy. A socket strip 21 is secured to one of the end members 15 by suitable means (not shown). A second socket strip 22 may be energized from the timer T which, if desired, is energized through the line 23 from the first socket strip 21. The line 24 is provided for connecting the socket strip 22 to the timer T. Suitable lines 25 are provided for connecting the light source C either through the strip 22 as illustrated, or through the strip 21 if the timer T is not to be used. Thus, the timer T may be optionally used so that the plants on any tray or trays may be subjected to a predetermined amount of light and heat for a desired period of time.

A pair of vertical standards 26 and 27 are provided at one end of the superposed trays and are joined by a transverse member 30. A pair of vertical supports 28 and 29, bridged by the transverse member 31, are provided at the other end of the tray assembly. Each corner of the trays has an outwardly extending portion 32 carried by the sides 12a and 13a, respectively. An inwardly extending portion 33 is integrally carried by each of the outwardly extending portions 32. A threaded shank portion 34 passes through each of the inwardly extending sheet metal portions 33 and is provided with a nob 35 for engaging and disengaging the inwardly extending portions with the vertical standards, thus, positioning the tray in desired adjusted position. Normally, the trays are spaced for ready access by the user to the plants P supported on the shelves.

While a prefered embodiment of the invention has been described using specific terms such description is for illustrative purposes only, and it is to be understood that changes and variations may be made without departing from the spirit or scope of the following claim.

What is claimed is:

A device for growing plants such as germinating seeds, growing seedlings and the like including, a plurality of vertically spaced superposed shelves for supporting the plants, at least one of said trays having an open upper water-tight tray portion having a bottom, sides and end portions, a lower reflective element carried by said one of said shelves closely adjacent the upper tray portion, said lower reflective element being secured to said sides and end portions and having a horizontal partition with a reflective lower surface in spaced parallel relation to the bottom and a downwardly extending shield, a light source carried by the partition closely adjacent the reflective surface to provide radiant energy to plants below directed thereto by the shield and a gentle heat transfer to the plants on the tray portion above, and support means carrying said shelves.

References Cited by the Examiner

UNITED STATES PATENTS

| | | | |
|---|---|---|---|
| 681,098 | 8/1901 | Brown | 108—107 |
| 2,928,211 | 3/1960 | Martin | 47—1.2 |

FOREIGN PATENTS 965,769  8/1964  Great Britain.

OTHER REFERENCES

Park's Flower Book 1964, copyrighted 1963, p. 79.
The New York Times, Jan. 29, 1961, p. X47.

ANTONIO F. GUIDA, *Acting Primary Examiner.*

ABRAHAM G. STONE, *Examiner.*

P. A. RAZZANO, *Assistant Examiner.*